United States Patent
Griffith et al.

(10) Patent No.: US 9,336,405 B2
(45) Date of Patent: May 10, 2016

(54) PHOTOGRAPHIC COPY PREVENTION OF A SCREEN IMAGE

(71) Applicant: International Business Machines Corporation, Armonk, NY (US)

(72) Inventors: Douglas J. Griffith, Georgetown, TX (US); Richard B. Sutton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/474,583

(22) Filed: Sep. 2, 2014

(65) Prior Publication Data

US 2016/0063265 A1    Mar. 3, 2016

(51) Int. Cl.
*H04L 29/06* (2006.01)
*G06F 21/62* (2013.01)
*G06F 7/58* (2006.01)

(52) U.S. Cl.
CPC ............ *G06F 21/6209* (2013.01); *G06F 7/582* (2013.01)

(58) Field of Classification Search
CPC ............................. G06F 21/6209; G06F 7/582
USPC .......................................................... 726/33
See application file for complete search history.

(56) References Cited

U.S. PATENT DOCUMENTS

| | | | | |
|---|---|---|---|---|
| 7,206,409 | B2 * | 4/2007 | Antonellis | H04N 5/913 380/201 |
| 7,634,134 | B1 * | 12/2009 | So | G06T 1/0085 380/201 |
| 7,693,330 | B2 * | 4/2010 | So | G06T 1/0085 380/201 |
| 8,108,928 | B2 * | 1/2012 | Jin | G06F 21/10 713/165 |
| 2004/0111611 | A1 * | 6/2004 | Jin | G09C 5/00 713/163 |
| 2005/0238167 | A1 * | 10/2005 | Duffield | H04N 5/913 380/203 |
| 2009/0129746 | A1 | 5/2009 | Isnardi et al. | |
| 2011/0122369 | A1 | 5/2011 | Moshe et al. | |

FOREIGN PATENT DOCUMENTS

WO        2011021111 A1    2/2011

\* cited by examiner

*Primary Examiner* — Michael S McNally
(74) *Attorney, Agent, or Firm* — Michael O'Keefe; Damion Josephs

(57) ABSTRACT

A method for preventing photographic capture of a displayed image on an electronically controlled screen using a photographic capture device is provided. The method includes intercepting an image for display; generating a plurality of subset frames based on the intercepted image; dividing the intercepted image into a plurality of subsections; generating a pseudo random number on each of the subsections within the plurality of subsections using a pseudo random number generator; mapping, on each of the subset frames within the plurality of subset frames, a group of subsections within the plurality of subsections that share a common generated pseudo random number; and determining a frame rate value for displaying the plurality of subset frames, which enables human visualization of the plurality of subset frames as a single perceived frame.

14 Claims, 4 Drawing Sheets

PHOTOGRAPHIC COPY PREVENTION OF A SCREEN IMAGE

BACKGROUND

The present invention generally relates to the field of computing, and more particularly to image processing.

Many types of computer display screens may be used to present information. For example, computer screens, tablet screens, and smartphone screens may display sensitive and confidential information. Also, according to other examples, cinematic projection may present visual access to confidential and/or copyright protected material.

SUMMARY

According to one embodiment, a method for preventing photographic capture of a displayed image on an electronically controlled screen using a photographic capture device is provided. The method includes intercepting an image for display; generating a plurality of subset frames based on the intercepted image; dividing the intercepted image into a plurality of subsections; generating a pseudo random number on each of the subsections within the plurality of subsections using a pseudo random number generator; mapping, on each of the subset frames within the plurality of subset frames, a group of subsections within the plurality of subsections that share a common generated pseudo random number, whereby a single mapped subset frame contains a single group of subsections within the plurality of subsections sharing the common generated pseudo random number and the mapping is performed from the lowest generated pseudo random number to the highest generated pseudo random number; and determining a frame rate value for displaying the plurality of subset frames, which enables human visualization of the plurality of subset frames as a single perceived frame.

According to another embodiment, a computer system for preventing photographic capture of a displayed image on an electronically controlled screen using a photographic capture device is provided. The computer system includes one or more processors, one or more computer-readable memories, one or more computer-readable tangible storage medium, and program instructions stored on at least one of the one or more tangible storage medium for execution by at least one of the one or more processors via at least one of the one or more memories, where the computer system is capable of performing a method. The method includes the steps of: intercepting an image for display; generating a plurality of subset frames based on the intercepted image; dividing the intercepted image into a plurality of subsections; generating a pseudo random number on each of the subsections within the plurality of subsections using a pseudo random number generator; mapping, on each of the subset frames within the plurality of subset frames, a group of subsections within the plurality of subsections that share a common generated pseudo random number, whereby a single mapped subset frame contains a single group of subsections within the plurality of subsections sharing the common generated pseudo random number and the mapping is performed from the lowest generated pseudo random number to the highest generated pseudo random number; and determining a frame rate value for displaying the plurality of subset frames, which enables human visualization of the plurality of subset frames as a single perceived frame.

According to yet another embodiment, a computer program product for preventing photographic capture of a displayed image on an electronically controlled screen using a photographic capture device is provided. The computer program product includes one or more computer-readable tangible storage medium and program instructions stored on at least one of the one or more tangible storage medium, the program instructions executable by a processor. The computer program product includes program instructions to: intercept an image for display; generate a plurality of subset frames based on the intercepted image; divide the intercepted image into a plurality of subsections; generate a pseudo random number on each of the subsections within the plurality of subsections using a pseudo random number generator; map, on each of the subset frames within the plurality of subset frames, a group of subsections within the plurality of subsections that share a common generated pseudo random number, whereby a single mapped subset frame contains a single group of subsections within the plurality of subsections sharing the common generated pseudo random number and the mapping is performed from the lowest generated pseudo random number to the highest generated pseudo random number; and determine a frame rate value for displaying the plurality of subset frames, which enables human visualization of the plurality of subset frames as a single perceived frame.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
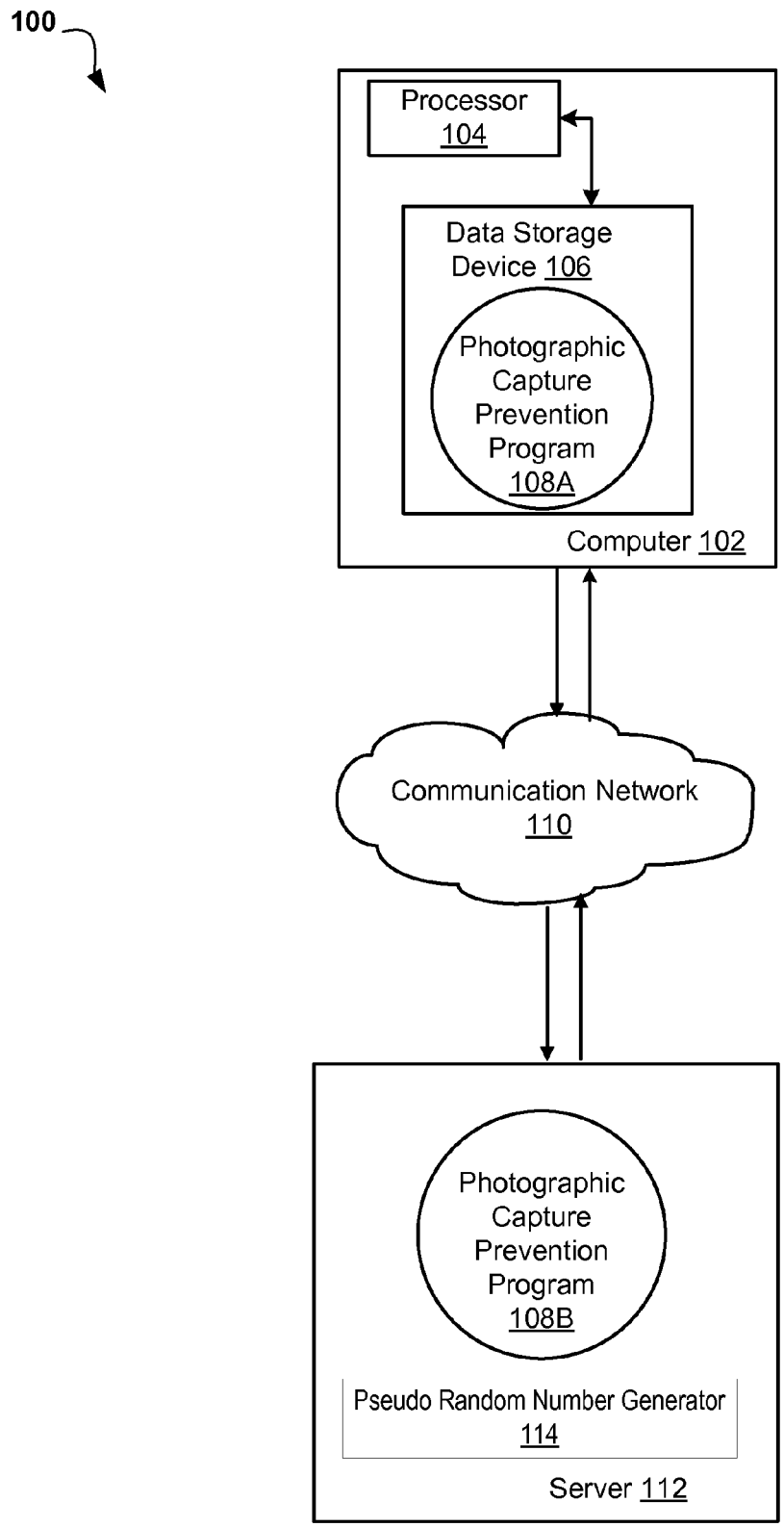
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relates to the field of computing, and more particularly to image protection. The following described exemplary embodiments provide a system, method, and program product to, among other things, provide photographic capture protection for a display screen.

As previously described with respect to display screen images, many types of display screens, such as computer screens, tablet screens, and smartphone screens, may be used to present sensitive and confidential information. Additionally, cinematic projection may present visual access to confidential and/or copyright protected material. However, the photographic image on the display screen may contain confidential or protected information the user does not wish to be reproduced. As such, the reproduction of confidential or protected information may result in identity theft, release of a trade secret, information protected under an attorney-client privilege, information protected under a doctor-patient privilege, and/or the duplication of copyrighted material. Therefore, it may be advantageous, among other things, to prevent photographic copy of a screen image.

The one or more exemplary embodiments described herein provide a solution to protecting a display screen from photographic capture and reproduction that may contain confidential or protected information. According to one exemplary embodiment described herein, a method for protecting an image visually presented on a display screen is provided. In accordance with one implementation, the image visually presented may be broken up into a series of small subsets of the original image. Cycling through the series of small subsets at a given frame rate may produce a complete image, as perceived by the human eye; however, when a photographic capture device is used to capture the presented image, the presented image appears as an incomplete image. Thus, visual access to potentially confidential (e.g., legal documents) or protected (e.g., copyright) information is prevented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide for protection from photographic capture of a display screen. Based on at least one implementation, the present embodiment displays a series of subset frames that are portions of an image frame. When viewed at a specific frame rate, the subset frames can be perceived as one image by the human eye, however the subset frames can be viewed as separate images when captured by a photographic capture device. As such, this technology may be used to safeguard protected or privileged information.

The present embodiment may be designed to help prevent someone from copying full replication of a user's screen information using standard photographic methods. According to one implementation, the present embodiment may include dividing the visual presentation information into smaller subsets (i.e. subsections of frames, dots, pixels, etc.) of the original image and cycling though those displayed portions of the visual presentation in such a way as to still allow human visual recognition. However, at the same time the present embodiment may prevent a singularly recognizable image of the screen from being captured in a single snapshot. Furthermore, according to at least one implementation, the present embodiment may mix the subsections constantly and vary the frame refresh rate such that a series of images of the screen are unlikely to result in a coherent image of the screen. Additionally, the present embodiment may be implemented in hardware via a graphics display adapter to apply to either a subsection or complete screen coverage and may be made software selectable as needed.

For example, assuming the standard physical screen image of X by Y pixels, the present embodiment employs a configurable subset of Z frames (which are subsets of the entire image) and a configurable refresh rate may be utilized. As such, the present embodiment may be implemented using a series of rules (e.g., a rule to display the subsets of the entire image in a diagonal pattern) that determines which pixels go into each of the Z subset frames and ensures that all pixels are displayed when the complete series of Z subset frames is displayed. The series of rules to implement by the present embodiment may be defined by the user. Additionally, the present embodiment may compensate for lower refresh rates by artificially brightening the pixels being displayed in each frame, thereby allowing the user to view the image on a computer screen. When the refresh rate is lower, the Z subset frames projected on the computer display screen may be more difficult for the human eye to perceive as a complete image. By brightening the pixels for lower refresh rates, human visual recognition of the image as a complete image is enhanced while the present embodiment continues to operate.

Referring now to FIG. 1, an exemplary networked computer environment 100 in accordance with one embodiment is depicted. The networked computer environment 100 may include a computer 102 with a processor 104 and a data storage device 106 that is enabled to run a Photographic Capture Prevention Program 108A. The networked computer environment 100 may also include a server 112 that is enabled to run a Photographic Capture Prevention Program 108B and a communication network 110. The networked computer environment 100 may include a plurality of computers 102 and servers 112, only one of which is shown for illustrative brevity. According at least one implementation, the present embodiment may also include a pseudo random number generator 114, which may be running on server 112. The pseudo random number generator 114 may implement patterns, such as horizontal, vertical, diagonal, scatter, etc., to create subsections to subset frames (described in more detail with respect to FIG. 3). The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

According to the present embodiment, a program, such as a Photographic Capture Prevention Program 108A and 108B may run on the client computer 102 or on the server computer 112. The Photographic Capture Prevention Program 108A, 108B will prevent the photographic copying of a screen image from a screen associated with a device, such as a computer 102. The Photographic Capture Prevention method is explained in further detail below with respect to FIG. 2.

Figure 2:
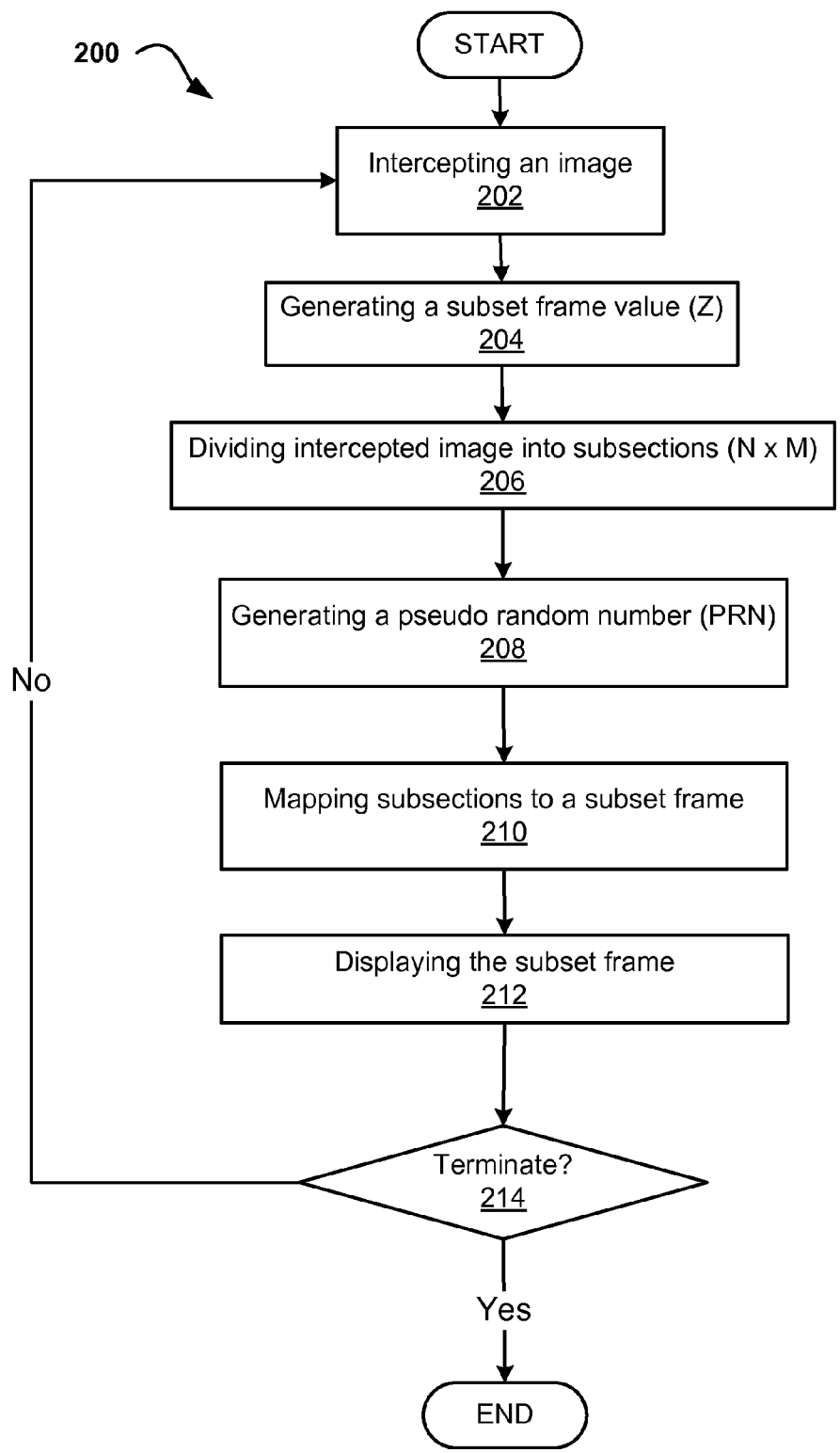
FIG. 2 is an operational flow chart illustrating the steps carried out by a program to prevent photographic copy of a screen image according to at least one embodiment.

FIG. 2, an operational flowchart 200 illustrating the steps carried out by a program to prevent photographic capture of a standard physical screen image of X by Y pixels in accordance with one embodiment is depicted. At 202 within the Photographic Capture Prevention Program 108A, 108B (FIG. 1), an image frame sent for projection on the computer display screen is intercepted in a repeated manner when the computer display screen is operating. The Photographic Capture Prevention Program 108A, 108B intercepts an image in a repeated manner. For example, as a user operating a computer, such as client computer 102 (FIG. 1), may be working, the present embodiment may automatically capture an image frame sent for projection on the computer display screen. The rate at which the Photographic Capture Prevention Program 108A, 108B intercepts an image may be based on the frame rate the computer display screen uses to project images. For example, if the computer display screen projects an image at 30 frames per second, then the Photographic Capture Prevention Program 108A, 108B may intercept images sent to the computer display screen 30 times per second. The Photographic Capture Prevention Program 108A, 108B may be manually disabled by the user to allow a photographic capture device, such as a camera, to reproduce the computer display screen.

Next at 204 within the Photographic Capture Prevention Program 108A, 108B (FIG. 1), a user configurable subset of Z blank subset frames is generated. For example, the user configurable variable Z may be set as 5. As such, upon capturing an image sent for projection on a computer display screen, the present embodiment generates 5 blank subset frames.

Then at 206 within the Photographic Capture Prevention Program 108A, 108B (FIG. 1), the intercepted image is divided into a number of subsections (i.e. N×M). As such, to create the number of subsections, the present embodiment may divide the intercepted image into a series of N×M boxes, whereby N and M may represent numbers configurable by the user or, in an alternate implementation, may be automatically generated by the Photographic Capture Prevention Program 108A and 108B (FIG. 1). Furthermore, N×M may represent the horizontal and vertical axis of the intercepted image. For example, if there are 5 subset frames, the total number of subsections is equal to 25 (i.e. 5×5). Similarly, in the same example, a greater number of smaller subsections may be implemented such that the 5 subset frames may be divided into 100 subsections (i.e. 10×10).

Following next at 208 within the Photographic Capture Prevention Program 108A, 108B (FIG. 1), a pseudo random number is generated. As such, according to one implementation a pseudo random number generator 114 (FIG. 1) running on a server, such as server 112 (FIG. 1), may be utilized to coordinate the distribution of the N×M subsections to the Z subset frames. Therefore, the pseudo random number generator 114 (FIG. 1) may assign a number, among the integers 1 through Z (i.e. the number of subset frames), to each of the N×M subsections. Then, a total of (N×M)/Z subsections may be assigned to each subset frame. The number assigned to a subsection by the pseudo random number generator 114 (FIG. 1) may correspond to the particular subset frame upon which the subsection may be displayed. Therefore, continuing with the example previously described above, when there are 5 subset frames and 25 subsections, the pseudo random number generator 114 (FIG. 1) may assign the numbers 1 through 5 to each of the subsections. As such, since there are 5 subset frames among which to divide the subsections, each subset frame may be assigned 5 subsections to display. Therefore, this designation would translate to 5 subsections being assigned the integer "1," five subsections being assigned the integer "2," and so on until all of the subsections have been assigned a pseudo random number that corresponds to a subset frame.

Next at 210 within the Photographic Capture Prevention Program 108A, 108B (FIG. 1), subsections are mapped to a subset frame. As such, once each of the N×M subsections is assigned a pseudo random number, the subsections may be mapped on the subset frame corresponding to the particular number assigned via the pseudo random number generator 114 (FIG. 1). Furthermore, the mapping of the N×M subsections to the Z number of subset frames may be performed, according to one implementation, from the subsections with the lowest generated pseudo random number to the subsections with highest generated pseudo random number. Additionally, each subset frame in the Z number of subset frames may contain a single group of subsections sharing a common generated pseudo random number. Therefore, when properly mapped, such a distribution may create Z number of subset frames that may each display a 1/Z portion of the original image.

Next at 212 within the Photographic Capture Prevention Program 108A, 108B (FIG. 1), the subset frames are displayed. Therefore, after the mapping of the number of subsections is complete, the Photographic Capture Prevention Program 108A, 108B (FIG. 1) may transmit the mapped subset frames containing 1/Z portion of the original image to the computer display screen for projection. According to one implementation, the subset frames may be projected on the computer display screen of the computer 102 at a frame rate that may still allow for human visual recognition of the image projected on the computer display screen while the computer is in use by the user. However, a singularly comprehensible image of the screen and derivatives of that captured digital image cannot be captured in a single snapshot by a photographic capture device, such as a camera. Furthermore, to compensate for lower refresh rates (or a large number of Z frames), the brightness of the individual subsections may be artificially brightened according to one implementation. Increasing the brightness of the individual subsections for lower refresh rates enables the human eye to more clearly visualize the image when the image is on the screen for a brief period of time.

Then at 214, it may be determined whether the method may terminate. According to one implementation, the method may terminate based on various circumstances, such as user intervention, the amount of elapsed time, system performance, etc. If it is determined that the method should terminate, then the method may end. However, if at 214, it is determined that the method should not terminate, then the method may continue back to step 202 to intercept a frame of the screen image as previously described.

It may be appreciated that FIG. 2 provides only an illustration of one implementation and does not imply any limitations with regard to how different embodiments may be implemented. Many modifications to the depicted environments may be made based on design and implementation requirements. For example, as previously described, the present embodiment may be implemented in hardware via a graphics display adapter to apply to either a subset or complete screen coverage and may be made software selectable as needed.

Figure 3:
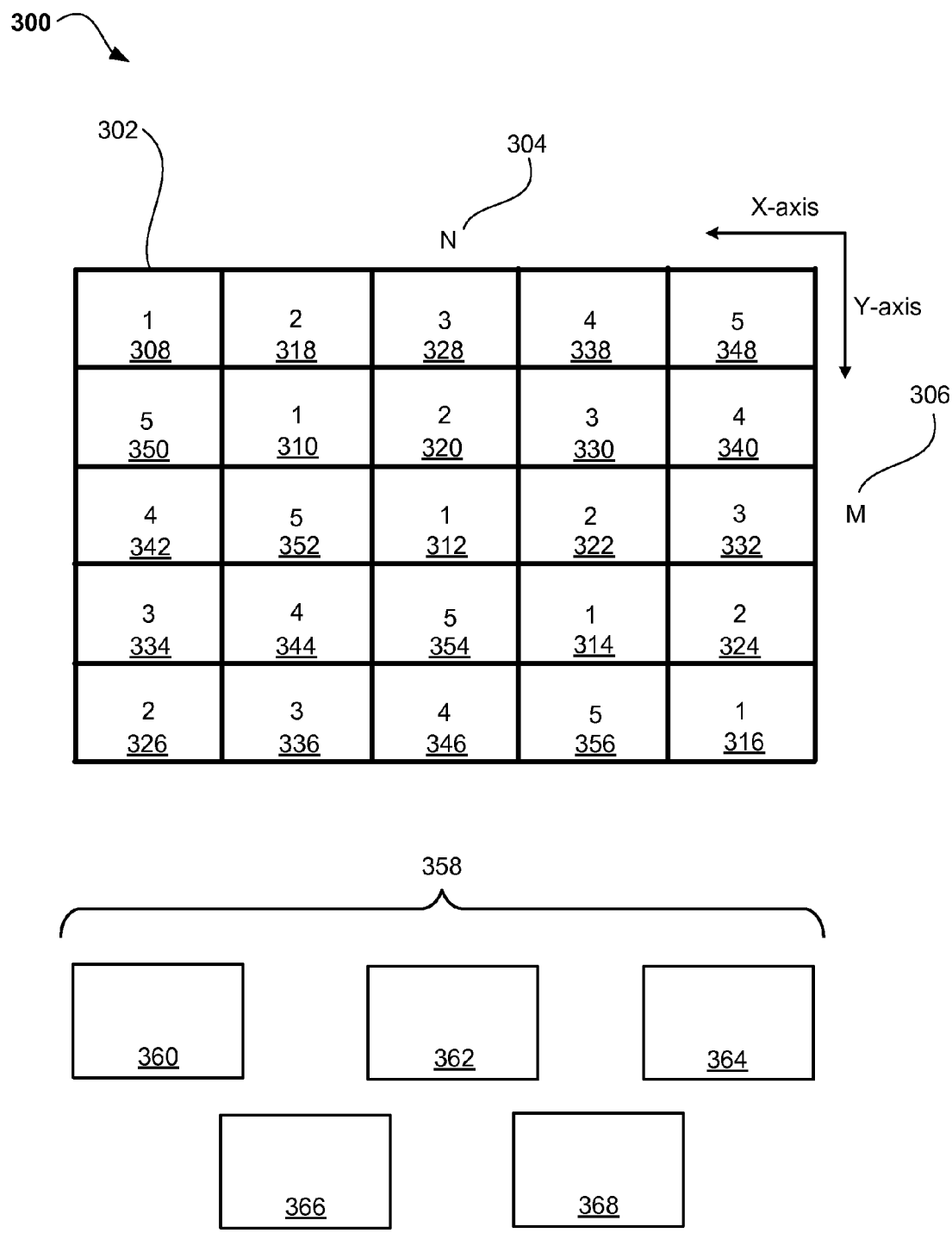
FIG. 3 an example of a combination of subset frames and subsections according to at least one embodiment.

Referring now to FIG. 3, an example 300 of an intercepted photographic image in accordance with one embodiment is depicted. Upon intercepting the image and generating a user configurable subset of Z blank subset frames 358 (as previously described with respect to the method explained in FIG. 2) within the Photographic Capture Prevention Program 108A and 108B (FIG. 1), the intercepted photographic image 302 may include a certain number of columns (i.e. N 304) that correspond to the X-axis of the intercepted image and a certain number of rows (i.e. M 306) that correspond to the Y-axis. As previously explained, N 304 and M 306 may represent numbers configurable by the user in one implementation or, in an alternate implementation, may be automatically generated by the Photographic Capture Prevention Program 108A and 108B (FIG. 1). Within the Photographic Capture Prevention Program 108A and 108B (FIG. 1), the values of N and M may be used to formulate the number of subsections 308-356 (i.e. N×M). For example, if the number of columns N 304 equals 5 (N=5) and the number of rows M 306 equals 5 (M=5), then the number of subsections 308-356 represented on the intercepted image 302 is 25 (i.e. 5×5=25).

For example purposes, the method previously explained in FIG. 2 may be implemented with respect to FIG. 3 as follows. Within the Photographic Capture Prevention Program 108A, 108B (FIG. 1), the pseudo random number generator 114 (FIG. 1) may assign each of the 25 subsections to one of the Z subset frames 358. Thereafter, in accordance with the method previously described in FIG. 2, the pseudo random number generator 114 (FIG. 1) may assign the 25 subsections 308-356 in a diagonal pattern (308-316) for displaying the subsections. Additionally, in accordance with alternate implementations, the pseudo random number generator 114 (FIG. 1) may implement other patterns, such as horizontal, vertical, scatter, etc., to map the subsections to the Z subset frames 358. For example, in accordance with FIG. 3, the pseudo random number generator 114 (FIG. 1) may assign a random number, such as the integer "1," to 5 subsections 308, 310, 312, 314, and 316, which may be equal to (M×N)/Z. According to one implementation, these 5 subsections 308, 310, 312, 314, and 316 may all be mapped to the same subset frame 360. Thereafter within the Photographic Capture Prevention Program 108A, 108B (FIG. 1), the same process may be implemented to map the remaining subsections 318-356 to the remaining subset frames 362-368. In addition, mapping the subsections 308-356 to the subset frames 360-368 may occur in the order of the lowest generated pseudo random number to the highest generated pseudo random number (e.g. "1" in 308-316 to "5" in 348-356) until all subsections 308-356 assigned a particular pseudo random number are mapped on the same subset frame 360-368. Upon completion of the mapping of the subsections 308-356, the subset frames 360-368 may be transmitted for projection at a frame rate that may allow for human visual recognition of the image on the computer display screen. However, according to the present embodiment, a singularly recognizable image of the screen may be prevented from being captured in a single snapshot by a photographic capture device, such as a camera. It may be appreciated that FIG. 3 provides only an illustration of one implementation of the distribution of the subsections on the subset frames and does not imply any limitations with regard to how different embodiments may be implemented. Many modifications to the depicted environments may be made based on design and implementation requirements.

Figure 4:
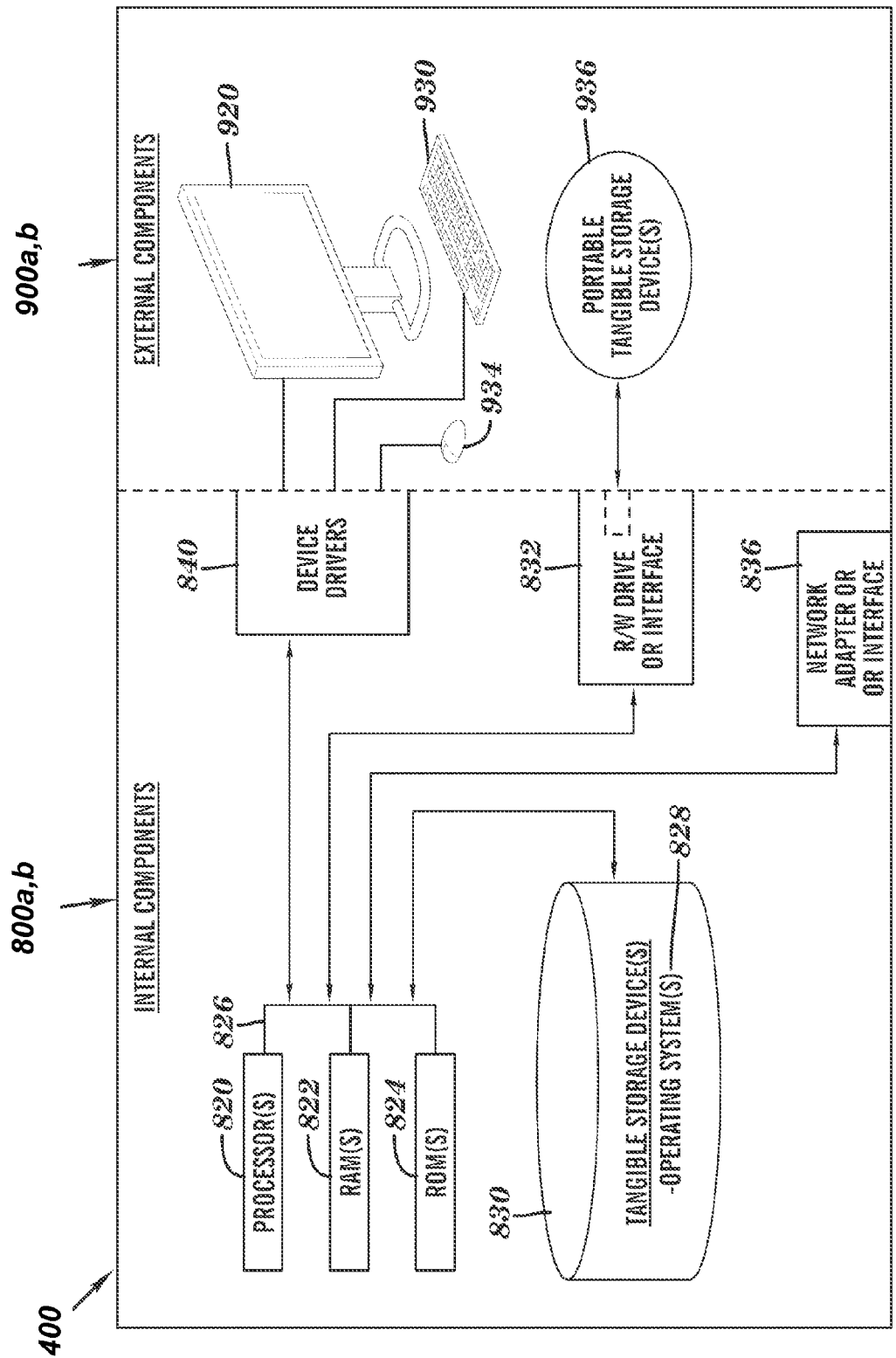
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Photographic Capture Prevention Program 108A (FIG. 1) in client computer 102 (FIG. 1) and Photographic Capture Prevention Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Photographic Capture Prevention Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The Photographic Capture Prevention Program 108A (FIG. 1) in client computer 102 (FIG. 1) and Photographic Capture Prevention Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Photographic Capture Prevention Program 108A (FIG. 1) in client computer 102 (FIG. 1) and the Photographic Capture Prevention Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for preventing the photographic capture of a displayed image on an electronically controlled screen of a photographic capture device, the method comprising:

intercepting, using a processor device, an image for display on the electronically controlled screen;

generating a plurality of subset frames based on the intercepted image;

dividing the intercepted image into a plurality of subsections;

generating a pseudo random number on each of the subsections within the plurality of subsections using a pseudo random number generator;

mapping, on each of the subset frames within the plurality of subset frames, a group of subsections within the plurality of subsections that share a common generated pseudo random number, wherein a single mapped subset frame contains a single group of subsections within the plurality of subsections sharing the common generated pseudo random number and the mapping is performed from the lowest generated pseudo random number to the highest generated pseudo random number;

determining a frame rate value for displaying the plurality of subset frames, wherein the frame rate value enables a human visual recognition of the plurality of subset frames as a single perceived frame corresponding to the intercepted image and disables a visualization from the electronically controlled screen of the photographic capture device;

varying the determined frame rate value for displaying the plurality of subset frames;

displaying the plurality of subset frames based on the varied determined frame rate; and brightening the individual subset frames within the displayed plurality of subset frames based on the varied determined frame rate.

2. The method of claim 1, wherein a total number of each of the subset frames within the plurality of subset frames is configurable.

3. The method of claim 1, wherein the total number of each of the subsections within the plurality of subsections is configurable.

4. The method of claim 1, wherein the generated pseudo random number is generated on each of the subsections within the plurality of subsections in at least one of a vertical pattern, a horizontal pattern, a diagonal pattern, and a scatter pattern.

5. The method of claim 1, wherein each of the subsections within the plurality of subsections is of a nonuniform size.

6. A computer system for preventing the photographic capture of a displayed image on an electronically controlled screen of a photographic capture device, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

intercepting, using a processor device, an image for display on the electronically controlled screen;

generating a plurality of subset frames based on the intercepted image;

dividing the intercepted image into a plurality of subsections;

generating a pseudo random number on each of the subsections within the plurality of subsections using a pseudo random number generator;

mapping, on each of the subset frames within the plurality of subset frames, a group of subsections within the plurality of subsections that share a common generated pseudo random number, wherein a single mapped subset frame contains a single group of subsections within the plurality of subsections sharing the common generated pseudo random number and the mapping is performed from the lowest generated pseudo random number to the highest generated pseudo random number;

determining a frame rate value for displaying the plurality of subset frames, wherein the frame rate value enables a human visual recognition of the plurality of subset frames as a single perceived frame corresponding to the intercepted image and disables a visualization from the electronically controlled screen of the photographic capture device;

varying the determined frame rate value for displaying the plurality of subset frames;

displaying the plurality of subset frames based on the varied determined frame rate; and brightening the individual subset frames within the displayed plurality of subset frames based on the varied determined frame rate.

7. The computer system of claim 6, wherein a total number of each of the subset frames within the plurality of subset frames is configurable.

8. The computer system of claim 6, wherein the total number of each of the subsections within the plurality of subsections is configurable.

9. The computer system of claim 6, wherein the generated pseudo random number is generated on each of the subsections within the plurality of subsections in at least one of a vertical pattern, a horizontal pattern, a diagonal pattern, and a scatter pattern.

10. The computer system of claim 6, wherein each of the subsections within the plurality of subsections is of a nonuniform size.

11. A computer program product for preventing the photographic capture of a displayed image on an electronically controlled screen of a photographic capture device, the computer program product comprising:

one or more non-transitory computer-readable tangible storage medium and program instructions stored on at least one of the one or more non-transitory tangible storage medium, the program instructions executable by a processor, the program instructions comprising:

program instructions to intercept, using a processor device, an image for display on the electronically controlled screen;

program instructions to generate a number of subset frames based on the received frame;

program instructions to divide the image into a number of subsections;

program instructions to generate, by the processor, a pseudo random number on each of the number of subsections using a pseudo random number generator;

program instructions to map on the number of subset frames, the number of subsections corresponding to the pseudo random number assigned to each individual subsection in the number of subsections;

program instructions to determine a frame rate value for displaying the number of subset frames, the frame rate value enabling a human visual recognition of the number of subset frames as a single perceived frame corresponding to the image and disables a visualization from the electronically controlled screen of the photographic capture device;

program instructions to vary the determined frame rate value for displaying the plurality of subset frames;

program instruction to display the plurality of subset frames based on the varied determined frame rate; and program instructions to brighten the individual subset frames within the displayed plurality of subset frames based on the varied determined frame rate.

12. The computer program product of claim 11, wherein a total number of each of the subset frames within the plurality of subset frames is configurable.

13. The computer program product of claim 11, wherein the total number of each of the subsections within the plurality of subsections is configurable.

14. The computer program product of claim 11, wherein the generated pseudo random number is generated on each of the subsections within the plurality of subsections in at least one of a vertical pattern, a horizontal pattern, a diagonal pattern, and a scatter pattern.

* * * * *